United States Patent [19]

Patrick

[11] 4,398,351

[45] Aug. 16, 1983

[54] THREAD LEAD GAUGE

[75] Inventor: Merlyn J. Patrick, Houston, Tex.

[73] Assignee: Raines Tool Company, Houston, Tex.

[21] Appl. No.: 321,453

[22] Filed: Nov. 16, 1981

[51] Int. Cl.³ .............................................. G01B 3/40
[52] U.S. Cl. ................................ 33/199 R; 33/147 M
[58] Field of Search ............. 33/199 R, 199 B, 147 J,
    33/147 R, 179.5, 147 F, 147 M, 147 T, 143 R,
    143 L

[56] References Cited

U.S. PATENT DOCUMENTS

| | | | |
|---|---|---|---|
| 1,256,967 | 2/1918 | Wolfe | 33/199 R |
| 1,357,588 | 11/1920 | Peck | 33/199 R |
| 1,456,938 | 5/1923 | Schoot | 33/199 R |
| 2,937,453 | 5/1960 | Peterson | 33/199 R |
| 3,090,126 | 5/1963 | Kernoski | 33/199 R X |
| 4,148,146 | 4/1979 | Holland | 33/199 R |

OTHER PUBLICATIONS

Allen Gauge & Tool Co., 1977.

*Primary Examiner*—William D. Martin, Jr.

[57] ABSTRACT

Disclosed is a thread lead gauge which includes a tubular barrel, a handle connected to the barrel, and a dial indicator connected to the handle and having a stem extending into the barrel. A single fixed bearing pin extends from the barrel and a single axially movable point is positioned spaced apart from and in line with the fixed point. A spring is provided for biasing the movable point away from the fixed point. The dial indicator indicates the position of the movable point with respect to the fixed point.

12 Claims, 4 Drawing Figures

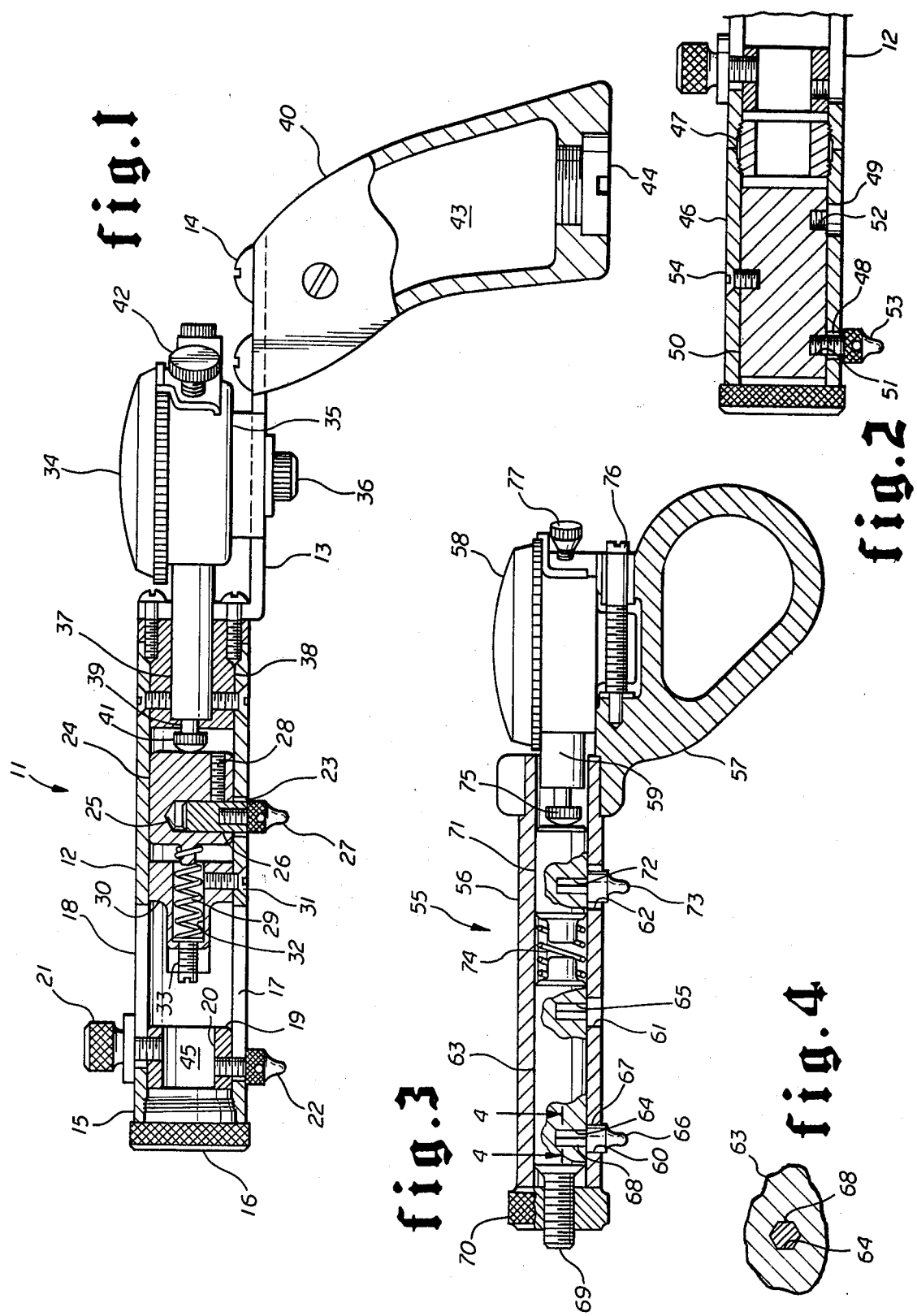

THREAD LEAD GAUGE

BACKGROUND OF THE INVENTION

1. Field of the Invention

The present invention relates generally to thread gauges, and more particularly to an improved gauge for checking thread lead error.

2. Description of the Prior Art

Lead is defined as the distance from a point on a screw thread to a corresponding point on the next thread measured parallel to the axis of the threaded member. Lead is typically measured over more than one thread so that any errors in lead will be compounded or multiplied by the number of threads and thus become more apparent. Since standard thread configurations have either an integral, for example 8 or 12 number of threads per inch or a half integral, for example $5\frac{1}{2}$ or $11\frac{1}{2}$, number of threads per inch, lead is typically measured over some integral number of inches, usually one or two inches.

There have been developed a number of gauges for measuring thread lead error. One such gauge is disclosed in U.S. Pat. No. 2,937,453. The gauge of the '453 patent includes a pair of spaced apart fixed points and a third point that is movably mounted for translation back and forth on an axis that is perpendicular to and bisects the axis between the two fixed points. A spring is provided for biasing the movable point away from the fixed points and a dial indicator is provided for measuring small movements of the movable point. The fixed points are adapted to engage one thread and the movable point is adapted to engage another thread some distance away from the thread engaged by the fixed points. The gauge is calibrated such that when the distance along the axis of translation of the movable point is precisely, for example, one inch, the dial indicator reads zero and there is no lead error. However, if the distance along the axis of translation is more than or less than one inch, the amount by which that distance differs from one inch, which is the lead error, is indicated on the dial indicator.

The gauge of the '453 patent has a number of errors inherent in its design. The errors result from the position of the two fixed points. The fixed points align with the helix angle of the thread, and hence a line perpendicular to the line connecting to the two points is not parallel to the axis of the threaded member. Thus, the movable point measures along a nonparallel line and does not measure true lead error. Additionally, when the gauge of the '453 patent is placed on the threaded member, the distance between the two fixed points defines a chord of a circle. The line of intersection between the line between the tips of the fixed points and the line of translation of the movable point is thus on the chord which is spaced apart from the surface of the threaded member. The movable point, on the other hand, is on the surface of the threaded member. Thus, the gauge of the '453 patent has a tilt with respect to the surface of the threaded member. The magnitude of the tilt error becomes more severe as the diameter of the threaded member is decreased.

Other types of lead gauges are those manufactured by Allen Gauge and Tool Company, as illustrated on Pages 8 and 9 of the Allen Gauge and Tool Company catalog, published 1977. The Allen gauges generally include a fixed point and a spaced apart movable point. The spacing between the fixed and movable points may be set at an integral or half integral number of inches. A complicated linkage and very special indicator system is provided to check lead error.

The Allen gauges have a number of shortcomings. Different gauge designs are required to measure external threads and internal threads in pipe or coupling sizes smaller than four inch nominal. Additionally, a different gauge is required for measuring buttress threads than is required for measuring threads having symmetrical flanks. Thus, several gauges are required in order to measure all sizes and styles of threads.

It is therefore an object of the present invention to provide a thread lead gauge that overcomes the shortcomings of the prior art. More specifically, it is an object of the present invention to provide one thread lead gauge that can be used for both internal and external threads of all styles. It is a further object of the present invention to provide a thread lead gauge that offers a continuously selectable range of distances over which lead error may be measured. It is a further object of the present invention to provide a thread lead gauge that is not affected by helix angle or diameter variations. It is still a further object of the present invention to provide a lead gauge that does not require a special setting standard to compensate for different angles of taper. It is yet a further object of the present invention to provide a thread lead gauge having positive means for ensuring that the contact points of the bearing pins are of the proper size and shape and that new unworn or undamaged ball contact surfaces are presented to the flank angles of the thread. It is a further object of the present invention to provide a thread lead gauge that has built in storage space for spare parts. It is yet a further object of the present invention to provide a thread lead guage that is simple, reliable, and easy to operate.

SUMMARY OF THE INVENTION

Briefly stated, the foregoing and other objects are accomplished by the thread lead gauge of the present invention. The thread lead gauge includes a tubular barrel that has a diameter small enough to fit into couplings and internally threaded pipes and joints. The barrel has connected at one end thereof a hand grip. Adjacent the other end of the barrel are a first axially extending slot and a spaced apart colinear second axially extending slot. A first piston is slidingly mounted in the barrel adjacent to the first slot. A first bearing pin is connected to the first piston and projects through the slot perpendicular to the axis of the barrel. The first piston is fixable axially within the barrel thereby to fix the axial position of the first bearing pin. A second piston is slidingly mounted within the barrel for movement adjacent to the second slot. A second bearing pin is connected to the second piston and projects through the second slot perpendicular to the axis of the barrel. Thus, the first and second pins are parallel to each other. A spring is provided for biasing the second piston, and thus the second bearing pin, away from the first piston, and thus the first bearing pin. A dial indicator is mounted to the end of the barrel adjacent the handle. The dial indicator includes a stem having an axially movable plunger with a tip on the end thereof. The tip contacts the second piston on the side opposite the spring. The dial indicator is settable such that when the points are a standard distance apart, as for example one inch, the dial reads zero. When the distance between the points is greater than or less than the standard distance, the amount of difference in distance is indicated on the dial indicator.

BRIEF DESCRIPTION OF THE DRAWINGS

FIG. 1 is a partial side section view of the preferred embodiment of the thread lead gauge of the present invention.

FIG. 2 is a fragmentary sectional view of the barrel extension of the present invention.

FIG. 3 is a partial side section view of an alternative embodiment of the thread lead gauge of the present invention.

FIG. 4 is a fragmentary sectional view taken along line 4—4 of FIG. 3.

DESCRIPTION OF THE PREFERRED EMBODIMENT

Referring now to the drawings, and first to FIG. 1, the thread lead gauge of the present invention is designated generally by the numeral 11. Gauge 11 includes generally a tubular barrel 12 and a pistol grip handle 40 connected to barrel 12 by an L shaped bracket 13. The connection between pistol grip handle 40 and bracket 13 is by screws, including screw 14, so that handles for gauge 11 may be readily interchangeable.

Barrel 12 has an internally threaded forward end 15 opposite handle 40. In the embodiment shown in FIG. 1, forward end 15 is normally closed by a threaded plug 16. Barrel 12 includes a first axially extending slot 17 and a diametrically opposed axially extending slot 18. Within barrel 12 there is disposed a piston 19 that is slidable within barrel 12 adjacent slots 17 and 18.

In the embodiment shown in FIG. 1, piston 19 has an axial bore 20 therethrough. Piston 19 is adapted to receive a threaded bearing pin 22 which is slidable axially in first slot 17. The axial position of bearing pin 22 may be changed over the length of first slot 17 by sliding piston 19 back and forth within barrel 12. The axial position of piston 19, and thus bearing pin 22, is fixed by means of a threaded locking screw 21, which extends through opposed slot 18 and is threadedly engaged with piston 19. The position of piston 19 is fixed by tightening locking screw 21. In order to change the position of bearing pin 22, locking screw 21 is loosened, which permits axial movement of piston 20.

Barrel 12 includes a second slot 23 that is spaced axially apart from and colinear width first slot 17. Within barrel 12 adjacent second slot 23 there is disposed a second axial movable piston 24. Second piston 24 has therein a radially bored socket 25 which is adapted to receive a bearing pin shank holder 26 to which is connected a second bearing pin 27. The radial position of shank holder 26 is fixed within second piston 24 by a set screw 28. The radial position of shank holder 26, and thus second bearing pin 27, may be adjusted with respect to the axis of barrel 12 by adjusting set screw 28. The radial adjustment of second bearing pin 27 allows for compensation for different taper angles, as will be discussed in greater detail hereinafter.

Second piston 24 and second bearing pin 27, which is substantially rigidly axially movable with second piston 24, are biased away from first bearing point 22 by a compression spring 29. Compression spring 29 is mounted within barrel 12 by third piston 30, the axial position of which is fixed, as for example by a screw 31. Compression spring 29 is supported within third piston 30 within a screw passage 32. A compression setting screw 33 is threaded into the end of third piston 30 and extends into screw passage 32. Adjustment of compression setting screw 33 allows for the compression of spring 29 to be varied. Compression setting screw 33 may be adjusted by removing plug 16 and inserting a screwdriver or the like into barrel 12 through bore 20.

Variations in axial position of second bearing pin 27 with respect to first bearing pin 22 are measured with a dial indicator 34. In the preferred embodiment, dial indicator 34 is manufactured according to American Gauge Design standards. American Gauge Design dial indicators are available from any of numerous sources, which those skilled in the art will readily recognize, and quickly interchangeable to various degrees of precision. The American Gauge Design dial indicators have various operating mechanisms, but all have standard external dimensions and are interchangeable from one manufacturer to another. The dial indicator may be selected so as to have appropriate units, as for example English or metric, and tolerances.

Dial indicator 34 includes a body 35 which is connected to bracket 13 by a screw 36. Dial indicator 34 also includes a stem 37, which is mounted within barrel 12 in a mounting tube 38 which is connected to bracket 13. Stem 37 has slidingly mounted therein a plunger 39 having a tip 41 thereon. Inward and outward movement of plunger 39 within stem 37 operates through the mechanism of dial indicator 34 to cause a reading on the face of dial indicator 34 in the well known manner.

Tip 41 is thus positioned within barrel 12 to contact second piston 24 and to move axially with piston 24 to indicate the position of second bearing pin 27 with respect to barrel 12 and first bearing pin 22.

In operation of the embodiment of FIG. 1, a distance over which the thread lead error is to be measured is chosen. This distance may be conveniently be one or two inches. However, the distance may be some other distance, as for example three, four or even five inches or the required length of perfect thread. The distance between first bearing point 22 and second bearing point 27 is set with a setting standard, which is, as is well known, a precision made bar having a plurality of spaced apart notches corresponding to precise thread leads. Because of the variable effective length of second bearing pin 27, a single setting standard may be used regardless of the taper of the thread being measured.

With bearing pin 27 approximately axially centered in second slot 23, bearing pin 27 is inserted in a notch of the setting standard. The position of first bearing pin 22 is then adjusted such that first bearing pin 22 fits into a second selected notch of the setting standard. With bearing pins 22 and 27 so positioned, dial indicator 34 is adjusted to read zero. Such zeroing of dial indicator 34 is accomplished coarsely by loosening screw 36 to adjust the axial position of dial indicator 34 with respect to barrel 12, and finally by loosening a bezel adjustment screw 42 to turn the dial to zero with respect to the needle of dial indicator 34.

After bearing pins 22 and 27 have been spaced appropriately and dial indicator has been zeroed, then gauge 11 may be used to check the lead error of both male and female threaded members of all diameters and of all thread styles.

Referring still to FIG. 1, the gauge of the present invention offers space for storage of various spare parts, as for example extra bearing pins and setting standards. Pistol grip handle 40 is hollow to define a chamber 43 which is closed by an end plug 44. Also, the end of barrel 12 defines a chamber 45 which is normally closed by plug 16. Chambers 43 and 45 provide ample storage space which may be convenient when gauge 11 is being used in the field.

Referring to FIG. 2, there is shown means for increasing the length over which thread lead error may be measured. There is provided a tubular barrel extension 46 which is connectable to the end of barrel 12 by an adaptor 47. Barrel extension 46 includes a pair of axially spaced apart colinear slots 48 and 49, which are spaced apart some distance, as for example one inch. Within barrel extension 46 there is disposed a piston 50 which has a pair of axially spaced apart sockets 51 and 52, which are spaced apart a distance to correspond with the spacing of slots 48 and 49. Sockets 51 and 52 are adapted to receive a bearing pin, as for example bearing pin 53. The position of piston 50 is suitable fixed within barrel extension 46, as for example by a screw 54.

Referring now to FIG. 3, there is shown an alternative embodiment of the gauge of the present invention, which is designated by the numeral 55. Alternative gauge 55 includes generally a barrel 56, a handle 57 connected to barrel 56, and a dial indicator 58 connected to handle 57 and having a stem 59 extending into barrel 56.

Barrel 56 includes a pair of spaced apart forward slots 60 and 61, and a third spaced apart elongated slot 62. Slots 60, 61, and 62, are colinear, and, in the embodiment shown in FIG. 3, substantially equally spaced apart.

Barrel 56 has disposed therein a piston 63 which includes a pair of spaced apart bearing pin sockets 64 and 65. Sockets 64 and 65 and colinear and spaced apart a distance corresponding to the spacing of slots 60 and 61 and are adapted to receive the shank of a bearing pin, as for example bearing pin 66. Bearing pin 66 includes a circular shoulder 67 which is adapted to fit snuggly within slot 60. As best shown in FIG. 4, bearing pin 66 includes a polygonal shank 68, which in the preferred embodiment has a hexagonal cross-section. The hexagonal shape of shank 68 allows bearing pin 66 to be indexed positively to a plurality of pistons. Thus, if the bearing surface of bearing pin 66 becomes damaged, then a fresh surface may be presented to the thread. Appropriate numerals or colors may be applied to bearing pin 66 to allow the operator to keep track of the position of bearing pin 66.

The position of piston 63 within barrel 56 is fixed by means of a threaded end piece 69 which is engaged with a nut 70 that bears against the end of barrel 56. When bearing pin 66 is inserted in socket 64, nut 70 may be tightened thereby to wedge bearing pin 66 firmly into slot 60.

Within barrel 56 adjacent slot 62 there is disposed a second piston 71. Second piston 61 includes a socket 72 having a polygonal cross-section, which is adapted to receive the shank of a bearing pin 73. Piston 71 and bearing pin 73 are biased away from piston 63 and bearing pin 66 by a compression spring 74. The length of bearing pin 73 may be chosen to be longer than that of bearing pin 66 so that thread lead error may be measured over various tapers using only a single setting standard having exact match spring without taper compensation.

Again, the position of bearing pin 73 with respect to bearing pin 66 is measured with dial indicator 58, which includes a tip 75 which contacts piston 71. Dial indicator 58 is zeroed on the setting standard either by adjusting a mounting screw 76 or by adjusting bezel adjustment screw 77.

From the foregoing it will be seen that this invention is one well adapted to attain all of the ends and objects hereinafter set forth, together with other advantages which are obvious and which are inherent to the apparatus.

It will be understood that certain features and subcombinations are of utility and may be employed with reference to other features and subcominations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A thread lead gauge, which comprises:
   a tubular barrel, said barrel including a first axially extending slot and a second axially extending slot spaced axially apart from and colinear with said first a axially extending slot;
   a first piston slidingly mounted in said barrel for movement within said barrel adjacent said first slot;
   a first bearing pin connected to said first piston and projecting through said first slot perpendicular to the axis of said barrel;
   means for fixing the axial position of said first piston, thereby to fix the axial position of said first bearing pin;
   a second piston slidingly mounted within said barrel for movement adjacent said second slot;
   a second bearing pin connected to said second piston and projecting through said second slot perpendicular to said barrel;
   means for biasing said second piston axially away from said first piston;
   a dial indicator having a stem mounted coaxial with said barrel, said stem including an axially movable plunger having a tip contacting said second piston;
   and a hand grip connected to said barrel.

2. The thread lead gauge as claimed in claim 1, wherein said fixing means includes:
   a third axially extending slot spaced circumferentially apart from said first slot;
   and a set screw connected to said first piston and extending through said slot.

3. The thread lead gauge as claimed in claim 1, wherein said biasing means includes:
   a third piston fixed within said barrel between said first and second pistons;
   said spring compressed between said second and third pistons.

4. The thread lead gauge as claimed in claim 3, including means for adjusting the compression of said spring.

5. The thread lead gauge as claimed in claim 4, wherein:
   a said third piston includes a bore containing said spring;
   and said compression adjusting means includes a screw threaded into said third piston and having an end contacting said compression spring within said bore.

6. The thread lead gauge as claimed in claim 1, wherein:
   said first piston includes an axially extending passageway therethough;

and said barrel includes and end cap.

7. The thread lead gauge as claimed in claim 1, wherein said hand grip includes an internal cavity having an access port and means for closing said access port.

8. The thread lead gauge as claimed in claim 1, wherein:
   said first and second bearing pins each include a shank having a polygonal cross-section;
   and said first and second pistons each include a bearing pin shank socket having a polygonal cross-section configured to mate with said shank of said bearing pin.

9. The thread lead gauge as claimed in claim 8, wherein:
   said first bearing pin includes a circular shoulder portion;
   and said first slot has a length substantially equal to the diameter of said circular shoulder portion.

10. The thread lead gauge as claimed in claim 9, wherein:
    said barrel includes a third slot spaced apart from and colinear with said first and second slots;
    and said first piston includes a second bearing pin shank socket.

11. The thread lead gauge as claimed in claim 1, wherein:
    said second bearing pin projects perpendicularly from said barrel a distance greater than the distance that said first bearing pin projects perpendicularly from said barrel, the difference in distance being chosen such that when the bearing points are inserted into tapered threads the axis of the barrel remains parallel to the axis of the threaded member being measured.

12. The thread lead gauge as claimed in claim 1, including:
    a barrel extension connectable coaxially with said barrel, said barrel extension including means for attaching perpendicularly thereto a bearing pin.

* * * * *